US012737434B2

(12) United States Patent
Horev et al.

(10) Patent No.: US 12,737,434 B2
(45) Date of Patent: Sep. 15, 2026

(54) TECHNIQUES FOR AGGREGATING INSIGHTS OF TEXTUAL DATA USING HIERARCHICAL CLUSTERING

(71) Applicant: GONG.io Ltd., Ramat Gan (IL)

(72) Inventors: Inbal Horev, Tel Aviv (IL); Rahm Fehr, Tel Aviv (IL); Inbal Ben Yehuda, Tel Aviv (IL); Shlomi Medalion, Lod (IL); Hadas Shick, Beit Guvrin (IL); Noy Cohen, Tel Aviv (IL); Eldad Shilo, Herzliya (IL)

(73) Assignee: Gong.io Ltd., Ramat Gan (IL)

( * ) Notice: Subject to any disclaimer, the term of this patent is extended or adjusted under 35 U.S.C. 154(b) by 47 days.

(21) Appl. No.: 18/640,263

(22) Filed: Apr. 19, 2024

(65) Prior Publication Data

US 2024/0354375 A1 Oct. 24, 2024

Related U.S. Application Data

(60) Provisional application No. 63/497,593, filed on Apr. 21, 2023.

(51) Int. Cl.
*G06F 18/231* (2023.01)
*G06Q 30/01* (2023.01)

(52) U.S. Cl.
CPC .......... *G06F 18/231* (2023.01); *G06Q 30/01* (2013.01)

(58) Field of Classification Search
CPC .............................. G06F 18/231; G06Q 30/01
USPC .......................................................... 707/737
See application file for complete search history.

(56) References Cited

U.S. PATENT DOCUMENTS

| | | | |
|---|---|---|---|
| 6,101,480 | A | 8/2000 | Conmy et al. |
| 6,219,639 | B1 | 4/2001 | Bakis et al. |
| 7,574,409 | B2 | 8/2009 | Patinkin |
| 8,214,242 | B2 | 7/2012 | Agapi et al. |
| 8,706,678 | B2 | 4/2014 | Stefik |
| 9,479,736 | B1 | 10/2016 | Karakotsios |
| 10,282,759 | B1 | 5/2019 | King et al. |
| 10,318,927 | B2 | 6/2019 | Champaneria |

(Continued)

FOREIGN PATENT DOCUMENTS

| | | | |
|---|---|---|---|
| EP | 3432155 | A1 | 1/2019 |
| WO | 2019016119 | A1 | 1/2019 |

OTHER PUBLICATIONS

Great Learning Team. "Understanding Latent Dirichlet Allocation (LDA)". Oct. 16, 2020. https://www.mygreatlearning.com/blog/understanding-latent-dirichlet-allocation/.

(Continued)

*Primary Examiner* — Joshua Bullock

(57) ABSTRACT

A system and method for discovering and aggregating themes. The method includes applying a trained clustering model to a plurality of textual data, wherein the trained clustering model determines at least one cluster of textual data based on a meaning of the textual data, wherein textual data of the at least one cluster is a portion of the plurality of textual data; generating a name, using a trained naming model, for each of the at least one cluster, wherein the generated name indicates a theme that represents the meaning of the textual data of the at least one cluster; analyzing the at least one cluster to determine a distribution metric of the at least one cluster; and generating a notification based on the determined distribution metric and the respective at least one cluster.

21 Claims, 8 Drawing Sheets

(56) References Cited

U.S. PATENT DOCUMENTS

| | | | | |
|---|---|---|---|---|
| 10,642,889 | B2 | 5/2020 | Reshef et al. | |
| 12,118,324 | B1 | 10/2024 | Zhang et al. | |
| 12,141,677 | B2 | 11/2024 | Silver et al. | |
| 12,182,728 | B1 | 12/2024 | Wick et al. | |
| 12,190,864 | B1 | 1/2025 | Xiao et al. | |
| 12,229,522 | B2 | 2/2025 | Gajek et al. | |
| 2009/0119095 | A1 | 5/2009 | Beggelman et al. | |
| 2009/0125998 | A1 | 5/2009 | Levy | |
| 2014/0214402 | A1 | 7/2014 | Diao et al. | |
| 2017/0083507 | A1 | 3/2017 | Ho et al. | |
| 2018/0176508 | A1 | 6/2018 | Pell | |
| 2019/0318743 | A1 | 10/2019 | Reshef et al. | |
| 2020/0012886 | A1* | 1/2020 | Walters | G06F 17/18 |
| 2020/0265102 | A1 | 8/2020 | Ho et al. | |
| 2020/0293427 | A1* | 9/2020 | Walters | G06F 17/16 |
| 2021/0027772 | A1 | 1/2021 | Horev et al. | |
| 2021/0103608 | A1* | 4/2021 | Ganti | G06F 16/3347 |
| 2021/0286832 | A1* | 9/2021 | Prasad Tanniru | G06N 5/02 |
| 2021/0406735 | A1 | 12/2021 | Nahamoo et al. | |
| 2022/0092028 | A1 | 3/2022 | Layton et al. | |
| 2022/0115019 | A1 | 4/2022 | Bradley et al. | |
| 2022/0138388 | A1 | 5/2022 | Wang et al. | |
| 2022/0189489 | A1 | 6/2022 | Peeler et al. | |
| 2022/0245340 | A1 | 8/2022 | Yang et al. | |
| 2023/0112096 | A1* | 4/2023 | Choi | G06F 16/285 707/737 |
| 2023/0153177 | A1* | 5/2023 | Walters | G06F 9/547 382/225 |
| 2023/0162733 | A1 | 5/2023 | Moorsom et al. | |
| 2023/0169276 | A1 | 6/2023 | Cook | |
| 2023/0297786 | A1 | 9/2023 | Park et al. | |
| 2023/0360640 | A1 | 11/2023 | Asi et al. | |
| 2023/0376697 | A1 | 11/2023 | Chow et al. | |
| 2024/0273292 | A1* | 8/2024 | Lakshmin | G06F 40/284 |
| 2024/0289366 | A1 | 8/2024 | Hranj et al. | |
| 2024/0330589 | A1 | 10/2024 | Kotaru | |
| 2024/0355318 | A1 | 10/2024 | Beaver | |
| 2024/0403333 | A1* | 12/2024 | Bertschinger | G06F 16/287 |
| 2024/0428017 | A1 | 12/2024 | Shoham et al. | |
| 2025/0124053 | A1* | 4/2025 | Beltran | G06F 16/24573 |
| 2025/0181834 | A1* | 6/2025 | Joshi | G06F 16/358 |

OTHER PUBLICATIONS

Su, Hongjin, et al., "One Embedder, Any Task: Instruction-Finetuned Text Embeddings", 2022, pp. 1-9, Date accessed Apr. 19, 2024.

Su, Hongjin, et al., "One Embedder, Any Task: Instruction-Finetuned Text Embeddings", May 30, 2023, pp. 1-18, Date Accessed Apr. 19, 2024.

* cited by examiner

TECHNIQUES FOR AGGREGATING INSIGHTS OF TEXTUAL DATA USING HIERARCHICAL CLUSTERING

CROSS-REFERENCE TO RELATED APPLICATIONS

This application claims the benefit of U.S. Provisional Application No. 63/497,593 filed on Apr. 21, 2023, the contents of which are hereby incorporated by reference.

TECHNICAL FIELD

The present disclosure relates generally to processing textual data, more specifically to techniques for discovering themes of textual data using hierarchical clustering.

BACKGROUND

In sales organizations, meetings are often conducted via teleconference or videoconference calls. Further, emails are the primary communication means for exchanging letter offers, follow-ups, etc. In many organizations, sales calls are recorded and transcribed into textual data. Such textual data of transcribed calls, emails, and the like, are stored as corpus for subsequent review. It has been identified that such a corpus contains valuable information about the sales activity of an organization including, but not limited to, trends, processes, progress, approaches, tactics, and more. However, due to the complexity and the sheer volume of records contained in the corpus, reviewing these records and moreover, deriving insights from these records, is challenging and time-consuming, and in return, most of the information in the corpus cannot be exploited.

Extraction of sales information from records such as calls, meetings, emails, and the like, have been performed by, for example, identification of keywords or phrases in conversations saved in the textual corpus. Identification of keywords may flag meaningful conversations to follow up on or provide further processing and analysis. For example, identifying the word "expensive" in sales conversations may be utilized to improve the sales process.

A few solutions are discussed, in the related art, to identify keywords or phrases in the textual data. Such solutions are primarily based on textual searches or natural language processing (NLP) techniques. However, such solutions suffer a few limitations, including, but not limited to, the accuracy of identification of keywords and identification of keywords in a similar semantic field. The accuracy of such identification is limited as a search is performed based on keywords taken from a predefined dictionary. Moreover, transcriptions may not be accurate (e.g., background noise), and thus, the identification may not be complete if only a keyword search is applied.

Further, even if the transcription is clear and without errors, simple identification of keywords without understanding the subject matter (or themes) can result in incomplete deciphering of the textual data based on various conversations. To this end, methods to summarize and uncover subject matters can be helpful for analysis and navigation through large volumes of records. Such uncovering of subject matter in conversations may be particularly critical in sales settings where current and changing interests of the market and customers directly impact sales outcomes.

However, current approaches are often isolated to specific conversations and rely on input from users to search for specific subject matter, which creates an additional hurdle to appropriately select the relevant subject matter for which to search. For example, at present, users (e.g., sales leaders, C-level executives, and the like) request operations and strategy teams to conduct manual analysis to uncover insights and subject matter from customer interactions. In this case, a user needs to come up with a hypothesis on an unknown subject matter, and such anticipation of unknowns from the unknown subject matter as a starting point can be problematic. Furthermore, such manual analysis can be time-consuming and is most often limited to being based on little anecdotal evidence. To this end, it has been identified that methods to efficiently uncover customer and market interests from a vast number of conversations and translate such discoveries into practical applications are highly desired.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for discovering and aggregating themes. The method comprises: applying a trained clustering model to a plurality of textual data, wherein the trained clustering model determines at least one cluster of textual data based on a meaning of the textual data, wherein textual data of the at least one cluster is a portion of the plurality of textual data; generating a name, using a trained naming model, for each of the at least one cluster, wherein the generated name indicates a theme that represents the meaning of the textual data of the at least one cluster; analyzing the at least one cluster to determine a distribution metric of the at least one cluster; and generating a notification based on the determined distribution metric and the respective at least one cluster.

Certain embodiments disclosed herein also include a non-transitory computer readable medium having stored thereon causing a processing circuitry to execute a process, the process comprising: applying a trained clustering model to a plurality of textual data, wherein the trained clustering model determines at least one cluster of textual data based on a meaning of the textual data, wherein textual data of the at least one cluster is a portion of the plurality of textual data; generating a name, using a trained naming model, for each of the at least one cluster, wherein the generated name indicates a theme that represents the meaning of the textual data of the at least one cluster; analyzing the at least one cluster to determine a distribution metric of the at least one cluster; and generating a notification based on the determined distribution metric and the respective at least one cluster.

Certain embodiments disclosed herein also include a system discovering and aggregating themes. The system comprises: a processing circuitry; and a memory, the memory containing instructions that, when executed by the processing circuitry, configure the system to: apply a trained clustering model to a plurality of textual data, wherein the trained clustering model determines at least one cluster of textual data based on a meaning of the textual data, wherein textual data of the at least one cluster is a portion of the plurality of textual data; generate a name, using a trained naming model, for each of the at least one cluster, wherein the generated name indicates a theme that represents the meaning of the textual data of the at least one cluster; analyze the at least one cluster to determine a distribution metric of the at least one cluster; and generate a notification based on the determined distribution metric and the respective at least one cluster.

Certain embodiments disclosed herein include the method, non-transitory computer readable medium, or system noted above or below, further including or being configured to perform the following step or steps: segmenting the textual data of the plurality of textual data into textual units; and rephrasing the textual units to generate normalized formats of the textual units.

Certain embodiments disclosed herein include the method, non-transitory computer readable medium, or system noted above or below, wherein the trained clustering model is a hierarchical clustering model that determines at least one sub-cluster for each of the determined at least one cluster.

Certain embodiments disclosed herein include the method, non-transitory computer readable medium, or system noted above or below, further including or being configured to perform the following step or steps: aggregating the determined distribution metric and at least one other distribution metric of the at least one cluster, wherein the at least one other distribution metric is previously determined for the respective at least one cluster; and identifying a trend in the theme by comparing the aggregated determined distribution metric and the at least one other distribution metric.

Certain embodiments disclosed herein include the method, non-transitory computer readable medium, or system noted above or below, further including or being configured to perform the following step or steps: triggering the generation of the notification upon determination that the identified change is beyond a predetermined threshold value.

Certain embodiments disclosed herein include the method, non-transitory computer readable medium, or system noted above or below, wherein the distribution metric is a numerical value that indicates a quality of the at least one cluster, and wherein the distribution metric is at least one of: Silhouette scores, Dunn index, McClain-Rao index, and C-index.

Certain embodiments disclosed herein include the method, non-transitory computer readable medium, or system noted above or below, wherein the textual data is collected from at least one of: videoconferences, telephonic conversations, emails, text messages, chats, and customer relationship management (CRM) data.

Certain embodiments disclosed herein include the method, non-transitory computer readable medium, or system noted above or below, wherein the textual data of the at least one cluster is related to at least one of: sales and customer relationships.

Certain embodiments disclosed herein include the method, non-transitory computer readable medium, or system noted above or below, further including or being configured to perform the following step or steps: receiving an external input data from an external source; and filtering the plurality of textual data by mapping to the external input data, wherein a portion of the plurality of textual data that is not mapped is filtered out.

Certain embodiments disclosed herein include the method, non-transitory computer readable medium, or system noted above or below, wherein the trained clustering model applies any one of: hierarchical Latent Dirichlet Allocation (LDA), Bidirectional Encoder Representations from Transformers leveraged topic modeling (BERTopic), or hierarchical Density-based spatial clustering of applications (DBSCAN).

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
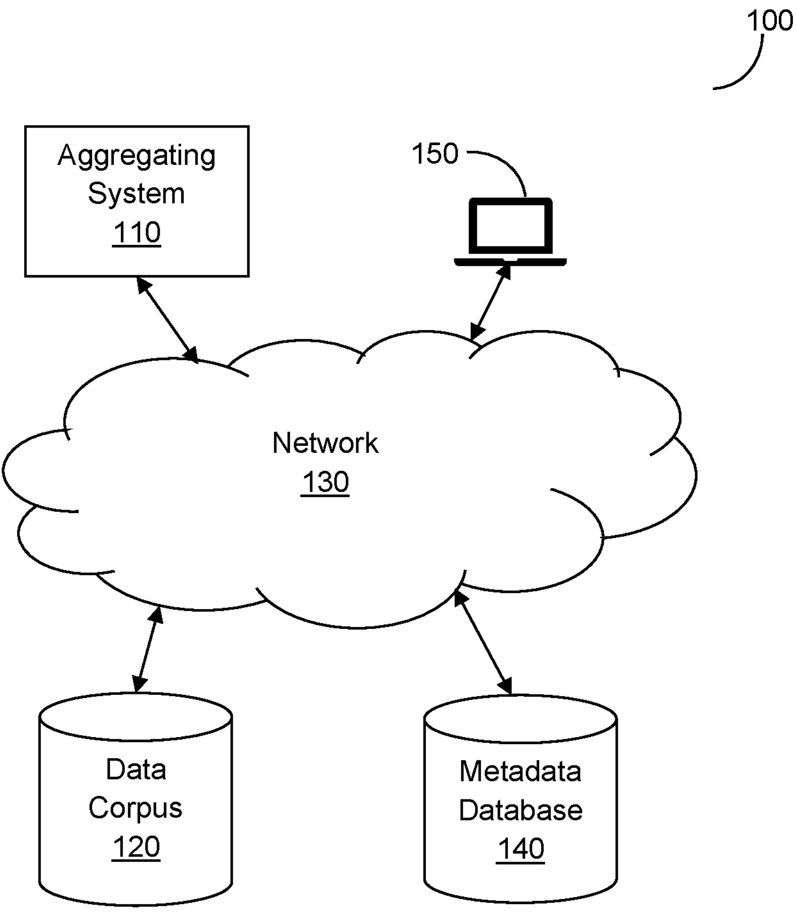
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments present a system and a method for discovering and aggregating themes using clustering and naming models. The method disclosed herein uncovers main themes and sub-themes present in conversations and/or other sources and aggregates data related to such uncovered themes for actionable insights. The clustering and naming model approach is utilized to accurately and efficiently discover themes in textual data collected from various conversations, such as, but not limited to, videoconferences, telephonic calls, emails, text messages, chats, and the like. The output of the trained model is hereinafter referred to as a theme data structure, which describes the discovered theme and has, for example, but not limited to, at least a generated cluster, data points within the cluster, a name, at least one value of distribution metrics, and the like, and any combination thereof. The clustering model is trained using a training dataset of textual data and/or segments of textual data and is trained to build clusters based on themes (or subject matter). Such a trained clustering model is applied to input textual data to rapidly uncover themes and sub-themes of various types of conversations for improved understanding. It should be noted that the discovered themes may be further utilized to perform specified searches to detect pertinent information that is not otherwise attainable while conserving computing resources. That is, the disclosed embodiments accurately discover themes in the vast amount of conversations and/or sources to allow precise and focused searching of themes with improved processing speed.

The embodiments disclosed herein also provide an advantageous objective analysis of conversations to improve consistency and accuracy in discovering themes and sub-themes. It has been identified that current methods of determining themes (or subject matter) of conversations can often be subjective, based on the hypothesis and expectations of individual users. Such subjective discovery of themes can largely vary and be inconsistent between individuals. To this end, the discovered themes may not accurately represent the contents of the conversations, which in return, when further analyzed and tracked, result in inaccurate insights regarding the conversations. However, the disclosed embodiments utilize a trained hierarchical clustering model that objectively and accurately identifies clusters of themes and sub-themes without subjective input from a user. Moreover, the disclosed embodiments provide, by applying a naming model to the clusters, objective identification of names for the clusters based on a plurality of rules defined by scores.

Moreover, the embodiments disclosed herein enable accurate discovery of themes and sub-themes, from associated clusters and sub-clusters, that are analyzed for further insights from various textual data. Such clusters, as disclosed, may readily be combined with other relevant textual data to provide close monitoring of interests in customers and the market. The discovery of themes and analyses may be utilized to identify valuable information and key opportunities that may otherwise be missed.

Specifically, the disclosed embodiments accurately determine clusters according to themes as well as their corresponding distribution metrics. The distribution metrics such as, but not limited to, Silhouette scores, Dunn index, McClain-Rao index, C-index, or the like validate the determined clusters for intra-group similarities and inter-group dissimilarities and represent them as numerical values. In an embodiment, the distribution metrics such as a score, a rank, and the like, and any combination thereof, are determined and aggregated to monitor the changes with respect to theme data structures that have the determined outputs of the multi-stage models and are analyzed. As an example, the aggregations may identify changes of theme data structures (and thus, the theme it describes) such as, and without limitation, null clusters, size change of cluster (e.g., number of textual units in the cluster, etc.), increased score, decreased score, reordered ranking, and the like, and more.

By monitoring the theme data structures and associated metric values, tracking of themes (or subject matter) in various conversations may be accurately performed. That is, the generated numerical values enable consistent and objective tracking of themes in certain textual data, over time, or the like. While manual monitoring of themes in textual data may be performed by a person, such a process apart from the disclosed embodiments requires extensive time, is inconsistent, and ultimately, a subjective process. It should be noted that the objective determination and tracking of changes and/or trends in theme data structures translate to accurate identification of trends in themes (or subject matter) in various parts of the collected textual data.

It has been identified that textual data are often large in size and followed by notable amounts of processing time and power for analyses. In addition, exponential amounts of textual data related to conversations are generated and collected during various communications in business including, but not limited to, telephone conversations, video conversations, chats, emails, customer relationship management (CRM) data, and the like, and any combination thereof. These analyses, particularly, accurate and efficient analyses of subject matter (i.e., semantics) in such textual data are challenging for computing resources, and further cannot practically be performed manually. However, the disclosed embodiments apply multi-stage machine learning models to facilitate the processing of the influx of data related to conversations (e.g., textual data, metadata, etc.) that are continuously collected and stored. In a further embodiment, one or more pre-processing techniques may be applied to simplify and/or reduce the input data applied to the multi-stage machine learning models, thereby further reducing computing time, power, and memory.

It should be further noted that the multi-stage process of machine learning models is performed at sufficiently rapid rates to provide guidance for ongoing engagements and market trends. Individual themes as well as aggregated insights are identified round-the-clock, based on the output theme data structures, for immediate suggestion and implementation in conversations. The sufficiently rapid and accurate analyses of the textual data enable actions to be performed at a relevant timing, for example upon detecting notable change in ranking, scores, and the like, rather than at a delayed timing when the analysis is no longer relevant.

FIG. 1 shows an example network diagram 100 utilized to describe the various disclosed embodiments. In the example network diagram 100, an aggregating system 110, a data corpus 120, a metadata database 140, and a user device 150 is connected to a network 130. The network 130 may be, but is not limited to, a wireless, a cellular, or wired network, a local area network (LAN), a wide area network (WAN), a metro area network (MAN), the Internet, the worldwide web (WWW), similar networks, and any combination thereof.

The data corpus (or simply "corpus") 120 includes textual data from transcripts, recorded calls or conversations, email messages, chat messages, instant messages, short message systems (SMS), chat logs, comments left on calls, information from a product board, net promotor score (NPS) ratings, customer relationship management (CRM) data, and other types of textual documents. In an example embodiment, the textual data in the corpus 120 include communication records, such as transcripts of telephone communications with customers. As an example, the textual data may include sales-related communication with a company and their customers. The textual data may originate from various types of communications such as, but not limited to, audio, video, image, virtually augmented sources, and the like; and thus, are not limited to communications using written texts. The corpus 120 provides textual data to the aggregating system 110 over the network 130. In an embodiment, the data corpus 120 may include clusters and respective names associated with the textual data as determined by the aggregating system 110. In a further embodiment, the data corpus 120 may include textual data with a plurality of segmented portions (or textual units), each associated with a theme and/or sub-theme that is discovered. The data discovered and stored in association with at least a theme and/or sub-theme are herein referred to as theme data structures.

The metadata database 140 may include metadata on textual data, for example, emails, transcribed calls, and the like, stored in the corpus 120. In an embodiment, metadata may include associated information of the textual data such as, but not limited to, participants' information, a time stamp, a time frame, and the like. In a further embodiment, metadata may include information retrieved from customer relationship management (CRM) systems or other systems that are utilized for keeping and monitoring deals. Examples of such information include participants of the textual data, a stage of a deal, an outcome of the deal, a date stamp, a company team, a vertical market, a business line, a tier, and so on. The metadata may be used in further analyses of textual data at the aggregating system 110.

The aggregating system 110 is configured with multi-stage models to uncover themes and sub-themes from the textual data in the corpus 120. The aggregating system 110 includes a clustering model that performs hierarchical clustering to divide the textual data based on themes (or subject matter). The clustering model is a machine learning model trained to output clusters (or groups) of textual units for the input textual data. At least one algorithm such as a hierarchical Latent Dirichlet Allocation (LDA), Bidirectional Encoder Representations from Transformers leveraged topic modeling (BERTopic), or the like, may be applied to text segments in a readable format. In another embodiment, clustering methods such as, but not limited to, hierarchical density-based spatial clustering of applications with noise (DBSCAN), may be used for clustering embedded texts. In an embodiment, the clustering model may be trained using the textual data of the corpus 120 to increase accuracy and consistency in clustering for theme discoveries.

The clustering model has a learning mode and an identification mode, where the learning mode may include training of the clustering model by applying an algorithm, such as an unsupervised machine learning algorithm and a semi-supervised machine learning algorithm using the training dataset. In the identification mode, the clustering model outputs one or more clusters (or groups) based on themes and sub-themes for the input textual data. It should be noted that hierarchical clustering in the clustering model not only identifies main themes, but also sub-themes that are within the larger cluster of main themes. As an example, a main theme of "competition" may include sub-themes of competition mentioned in positive context, negative feedback, comparison, trials, and the like. Additional input data from external sources may be applied during the identification mode of the clustering model in order to uncover themes (or subject matter) that are of interest to a user or current affairs. The external sources may include, for example, but are not limited to, social media, news aggregators, press releases, and the like, and more.

In an embodiment, an operator terminal (not shown) may be connected to the aggregating system 110 over the network 130 to provide training datasets to the clustering model. The operator terminal is a device, component, system, or the like, configured to enable trainer access to the aggregating system 110. In an embodiment, the operator terminal may be, but is not limited to, a personal computer, a laptop, a tablet computer, a smartphone, a wearable computing device, or any other device capable of receiving and displaying textual data.

The aggregating system 110 further includes a naming model that is configured to generate a name and/or description for each cluster that is output from the clustering model. The naming model identifies a name using the textual unit of the respective cluster in order to generate a name for each of the clusters and sub-clusters. In addition, a short description of the cluster may also be generated for the textual units in the same cluster (i.e., having the same theme). According to the disclosed embodiments, the aggregating system 110 may further analyze the clusters of uncovered themes, to identify the significance and relations of texts between clusters and within the cluster. In a further embodiment, tracking of, for example, and without limitation, frequencies of theme occurrences, the impact of theme, changes in relationships, changes in sub-themes for a particular theme, and the like, and more may be performed through such analyses. The results of the analyses are represented as, for example, but not limited to, a number, a score, a rank, and the like, and any combination thereof.

The aggregating system 110 may be realized as a physical machine (an example of which is provided in FIG. 8), a virtual machine (or other software entity) executed over a physical machine, and the like.

In an embodiment, the aggregating system 110 is configured to generate notifications such as, but not limited to, reminders, suggestions, and the like, based on outputs from the aggregating system 110. As noted above, outputs of the aggregation system 110 are parts of the theme data structure. For example, a sudden increase in a theme may trigger a generation of an alert. In another example, a suggestion to contact a customer may be generated from uncovering sub-themes of negative feedback from competitors. In the same example, a report may be generated together with the suggestion indicating portions of the conversation that were clustered as the respective sub-theme. In an embodiment, such notifications, and the like, may be presented to a user (e.g., a sales representative, a sales manager, etc.) via a user device 150. In an embodiment, a graphical user interface (GUI) on the user device 150 enables the user to interact with the aggregating system 110 to view output or portions of the output. In another embodiment, the user may input, via the user device 150, certain themes or features as requests to be accounted for in the discovery of themes in the aggregating system 110. It should be noted that such notifications may be provided in real time to prevent missed opportunities in customer-client relationships and actual sales.

The user device 150 may be, but is not limited to, a personal computer, a laptop, a tablet computer, a smartphone, a wearable computing device, or any other device capable of receiving and displaying textual data. In an embodiment, the user device 150 is used to present and display analyzed metrics of themes within the textual data in forms of, for example, but not limited to, a notification, a list, a report, a suggestion, a timeline, and the like. In some embodiments, the analyzed metrics may be presented to a user via an interactive graphical user interface (GUI). The interactive GUI may provide portions of the analyzed metrics, segmented according to business metadata such as, but not limited to, deal outcome, team, business line, tier, and the like. In such a scenario, a user may select themes and/or sub-themes to be displayed via the user device 150.

As an example, a user (e.g., a sales manager) may select a specific theme of "competitor mentions" in order to understand the top competitive objections for the sales team. The user device 150 is also used to present and display the textual data, for example, but not limited to, transcripts of conversations, emails, and more, that are received by the user. It should be noted that the type of notification may be different and predetermined based on the specific clusters discovered by the aggregating system 110.

It should be noted that the elements and their arrangement shown in FIG. 1 are shown merely for the sake of simplicity. Other arrangements and/or a number of elements should be considered without departing from the scope of the disclosed embodiments. For example, the aggregating system 110, the corpus 120, and the metadata database 140 may be part of one or more data centers, server frames, or a cloud computing platform. The cloud computing platform may be a private cloud, a public cloud, a hybrid cloud, or any combination thereof.

Figure 2:
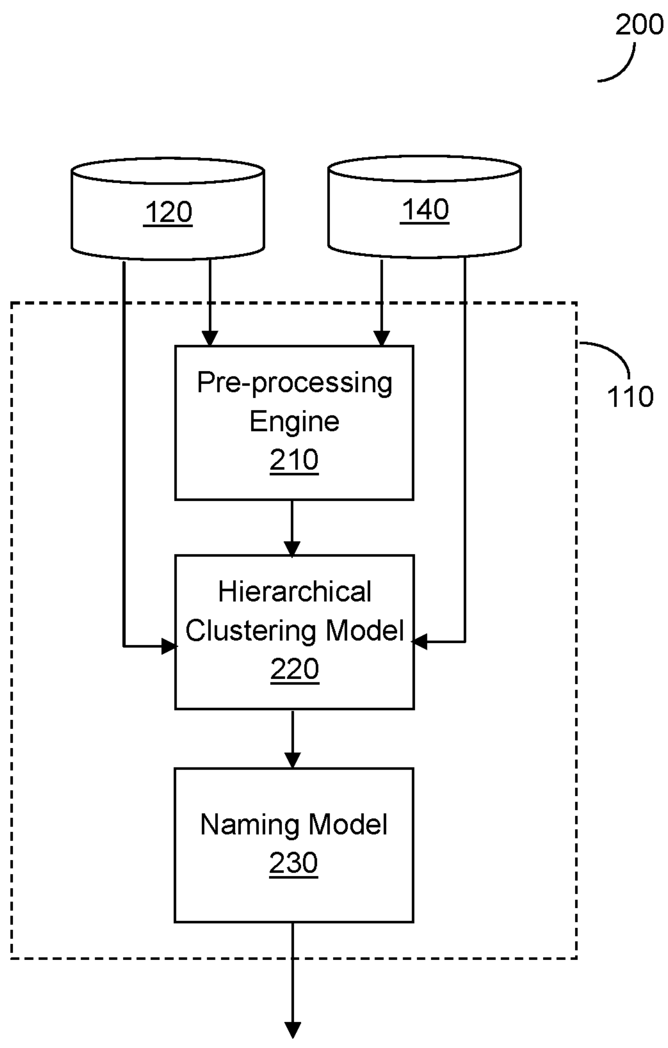
FIG. 2 is a flow diagram illustrating a multi-stage approach for discovering themes according to an embodiment.

FIG. 2 is an example flow diagram 200 illustrating a multi-stage approach for discovering themes according to an embodiment. The flow diagram 200 herein may be performed within the aggregating system 110, FIG. 1. For simplicity and without limitation of the disclosed embodiments, FIG. 2 will also be discussed with reference to the elements shown in FIG. 1.

The flow diagram 200 shows a two-stage modeling approach for clustering and naming the clusters of textual data. A hierarchical clustering model 220 is generated and trained to cluster textual data based on themes and sub-themes. The hierarchical clustering model 220 is generated by training using the textual data in the corpus 120 where an accuracy to cluster, by understanding the textual data, improves with ongoing training. The training of the clustering model 220 may be continuously performed until determined to be well trained. The decision to stop training of the clustering model 220 may be determined by a training personnel at an operator terminal (not shown) or after a predetermined number of iterations. In some embodiments, additional training datasets may be introduced through the operator terminal.

In an embodiment, the hierarchical clustering model 220 outputs clusters and subsets of each cluster (i.e., sub-clusters) to uncover themes and sub-themes, respectively, found in the textual data. Such themes provide insights into the content and subject matter discussed in the textual data of each cluster and/or sub-cluster. In some embodiments, metadata associated with the textual data and received from the metadata database 140 may be utilized in determining clusters. In an embodiment, the cluster and/or sub-cluster that are determined are part of a theme data structure. The theme data structure has at least one cluster that describes, and thus uncovers, the theme or subject matter of the textual data in the at least one sub-cluster. It should be noted that a trained hierarchical clustering model efficiently identifies themes in new textual data without additional training with respect to specific, for example, but not limited to, types of textual data, entities the textual data belongs to, and the like. To this end, it should be noted that the repeated training process on the hierarchical clustering model 220 may be omitted after the initial training to conserve processing time and resources for such training.

In an embodiment, the output clusters of the hierarchical clustering model 220 are input into a second stage naming model 230 to generate a name for each of the clusters and sub-clusters. In an embodiment, the name is generated based on textual units in the respective cluster where the name is, for example, but not limited to, the most representative text, most reoccurring text, high probability words, or the like. In a further embodiment, the naming model 230 may use portions of the textual unit to generate a name and a short description of the content of the cluster. The generated name and the short description describe the subject matter (i.e., meaning) of the textual units in the cluster.

In an embodiment, the clustering model and the naming model may be unsupervised machine learning algorithms such as, but not limited to, Latent Semantic Analysis (LSA), Probabilistic Latent Semantic Analysis (PLSA), Latent Dirichlet Allocation (LDA), Correlated Topic Model (CTM), other language models, large language models, and the like, to discover themes from input textual data. A non-limiting example of utilizing multi-stage models to discover themes (e.g., content, topics, etc.) is described in more detail in U.S. patent application Ser. No. 17/815,294 to Allouche et al., assigned to the common assignee, the contents of which are hereby incorporated by reference.

In some embodiments, a pre-processing engine 210 is utilized prior to applying the two-stage modeling approach of the clustering model 220 and the naming model 230. The pre-processing engine 210 receives textual data containing customer content from the corpus 120 such as, but not limited to, call transcripts, NPS ratings, product board data, emails, chats, CRM data, email correspondence, Slack® messages, comments left on calls, and the like. In an embodiment, the textual data may be segmented into smaller textual units and irrelevant textual units may be filtered out. The textual data may be segmented into smaller portions such as, but not limited to, paragraphs, sentences, a certain number of words, and the like. In an example embodiment, a portion of the textual data may include about 200 words. The textual data is segmented into one or more portions in order to allow each portion to include a single theme. In an embodiment, the size of the portion of the textual data may be predefined and updated through the operator terminal. Some common English words, for example, but not limited to, "the", "all", "about", and the like, may be also filtered out prior to further processing at the clustering model 220.

In a further embodiment, a rephrasing algorithm may be applied to re-write segmented textual units in abbreviated formats. The rephrasing algorithm summarizes the textual unit using extractive or abstractive methods to output in normalized formats such as, but not limited to, instructions, steps, and the like. It should be noted that such rephrasing eliminates irregularities from the textual data that are often conversational. In an embodiment, the output format may be predetermined and may be modified via, for example, a user device 150 and/or a user terminal (not shown). The rephrased textual units are uniformly formatted data structures to facilitate processing of the textual data onward. One of the ordinary skill in the art would understand that the uniformly normalized formats of the textual data reduce processing speed, thereby conserving computational resources.

Moreover, in some embodiments, the pre-processing engine 210 may be configured to filter data based on desired themes and/or from mapping between external sources released into the corpus 120. In an embodiment, a retrieval model may be implemented to collect textual data relevant to a query indicating, for example, desired themes, input from external sources, and the like, and more. In an embodiment, the external sources may include, for example, but not limited to, Twitter® feeds, news aggregators, company websites, press conference releases, LinkedIn® posts, and the like, and more. Data from the external sources may be collected and applied at any rate as well as in real-time, near real-time, or both. For example, the retrieval model collects textual data on a top trending topic. The collected textual data is applied during pre-processing to identify at least segments of the conversation (e.g., in the corpus 120) that are semantically similar and describe the same subject matter as the top trending topic. In the example scenario, the top trending topic is used to identify relevant data and eliminate data that are irrelevant for targeted processing and further, to conserve processing resources.

It should be noted that the first stage hierarchical clustering model 220, the second stage naming model 230, and optionally the pre-processing engine 210 may be realized as or executed as one or more hardware logic components and circuits. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

Figure 3:
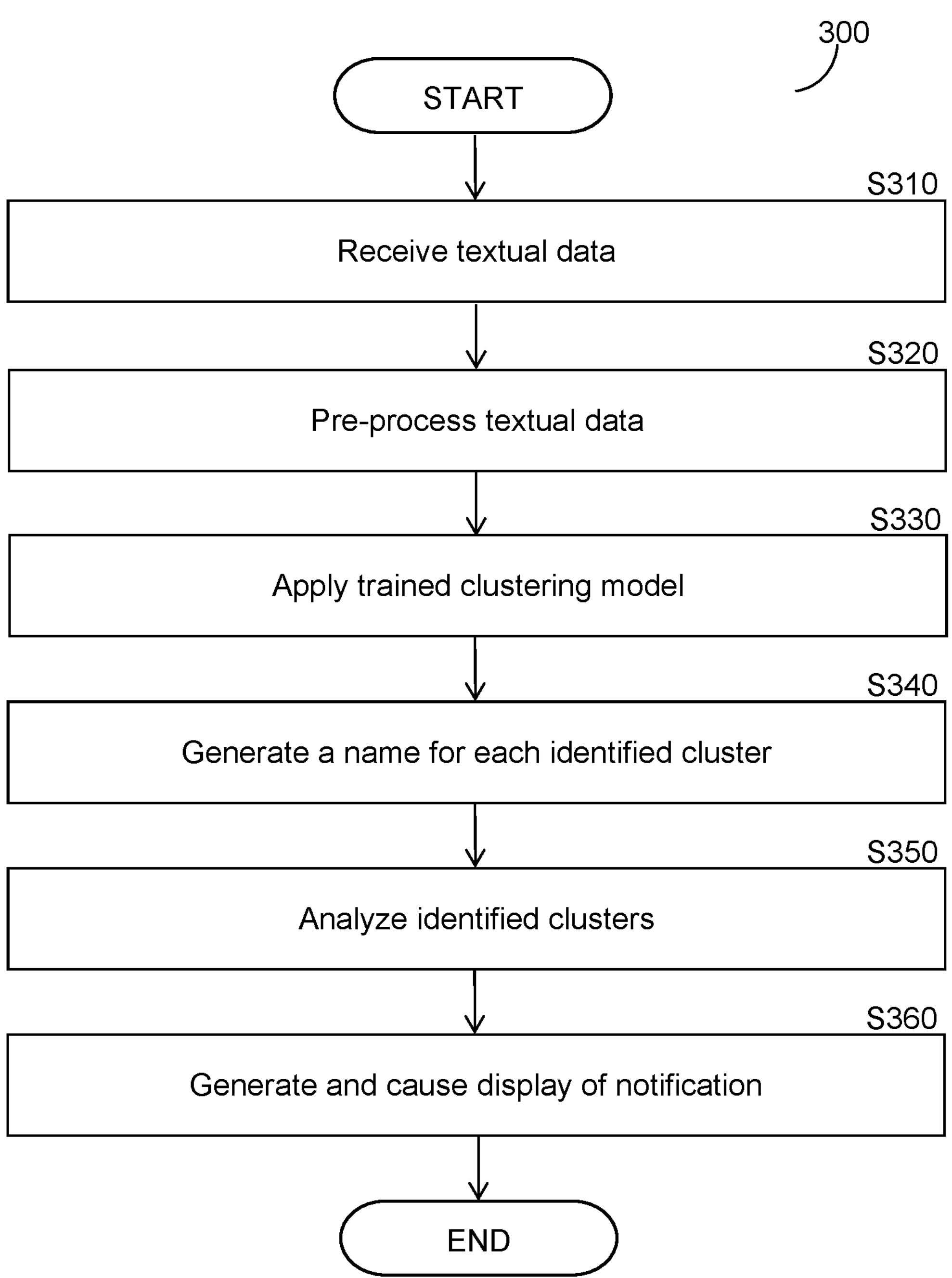
FIG. 3 is a flowchart illustrating a method for discovering and aggregating themes using a clustering model according to an embodiment.

FIG. 3 is an example flowchart 300 illustrating a method for discovering and aggregating themes according to an embodiment. The method described herein may be executed by an aggregating system 110, FIG. 1. In some example embodiments, the models in the aggregating system 110 may run an unsupervised machine learning algorithm, a semi-supervised machine learning algorithm, and the like.

At S310, textual data is received. The textual data includes customer contents such as, but not limited to, call transcripts, NPS ratings, and the like, and any combination thereof. The NPS rating is a metric that describes a degree of customer satisfaction and/or location. In an embodiment, the textual data is received from the corpus (e.g., the corpus 120, FIG. 1). In a further embodiment, metadata for the respective textual data may be received from the metadata database (e.g., the metadata database 140, FIG. 1). In an embodiment, the textual data and/or textual units may be represented as embeddings in vector format.

At S320, optionally, the received textual data are pre-processed. The textual data are segmented into smaller textual units and irrelevant segments may be filtered out. In an example embodiment, for short data (e.g., NPS ratings, and the like), each textual data may constitute a single textual unit. In another example embodiment, longer textual data from call transcripts may be segmented into smaller segments to include, for example, a single theme. As an example, the call transcript is segmented after a predefined number of speaker (e.g., each participant) turns, a predefined number of words, by question-and-answer pairs, or upon an appearance of annotations (e.g., comments that are overlaid on the call).

In an embodiment, the textual data may be further pre-processed by rewriting the segmented textual units into a concise, abbreviated format. The rewriting (or rephrasing) summarizes the textual unit using an extractive and/or abstractive method. In an embodiment, a prompt-able generative model may be utilized to cast the input textual data into a short, normalized format. It should be appreciated that such rewriting may eliminate irregularities that may be apparent in many textual data based on conversations, for example, call transcripts, emails, comments, chats, and the like. In a further embodiment, the generative model may receive instructions that specify desired output formats and provide extra context on the content of the textual unit. The uniform normalized format of the textual data enables efficient processing of the textual data to improve computational efficiency and utilization. The normalized format may be particularly advantageous in consideration of the diverse sources from which input data (e.g., customer content, conversations through various methods, etc.) is collected.

In a further embodiment, the textual data may be filtered based on a description of the desired theme or mapping between an external source released into the internal data or data of the corpus. Such desired theme and/or mapped theme define rules for filtering out and focusing on applicable textual data. In an example embodiment, a retrieval model may be utilized to collect data relevant to the query. Here, retrieval may be based on embedding the queries and textual units in the same embedding space by applying methods such as, but not limited to, Sentence Transformers, or by training the retrieval model using, for example, but not limited to, ATLAS. In some embodiments, the textual data are filtered based, for example, but not limited to predefined criteria set by a user, for example, via a user device (e.g., the user device 150, FIG. 1). In some implementations, the filtering is performed before, after, or both with respect to the segmentation of input textual data.

It should be noted that pre-processing reduces the amount of textual data to be processed for the discovery of themes from textual data, thereby conserving computing resources and memory. In an embodiment, the pre-processed textual data (or segmented textual units) may be stored in, for example, a data corpus (e.g., the data corpus 120, FIG. 1) with respect to the input textual data and/or its metadata. The pre-processed data in its normalized form may be readily searched and retrieved for processing without repeated pre-processing (e.g., segmenting, rephrasing, filtering, and the like). It should be noted that storage of pre-processed textual data eliminates repeated processing and enables rapid searching from the standardized data format.

At S330, a trained hierarchical clustering model is applied to the textual data. The textual data or segmented textual units are input to the trained hierarchical clustering model to uncover themes and sub-themes. In an embodiment, the clustering model divides the input textual data into groups based on understanding the subject matter of the textual data. The subject matter that describes an idea, setting, intent, or the like of the textual data is referred to as a theme. In a further embodiment, each cluster is further grouped into smaller sub-clusters. As an example, the textual data may be divided into clusters of themes such as, but not limited to, competition, new products, feedback, and the like. In an embodiment, training of the hierarchical clustering model is performed using textual data of a training dataset by applying at least one algorithm such as, but not limited to, hierarchical Latent Dirichlet Allocation (LDA), Bidirectional Encoder Representations from Transformers leveraged topic modeling (BERTopic), or hierarchical Density-based spatial clustering of applications (DBSCAN). In an embodiment, the generated clusters and sub-clusters are stored in a memory and/or a data corpus (e.g., the data corpus 120, FIG. 1). A theme data structure associated with a theme and has at least one of the clusters and/or sub-clusters, and data points (e.g., textual units, etc.), associated with the theme is stored in the data corpus (e.g., the data corpus 120, FIG. 1). It should be appreciated that the hierarchical clustering discovers themes and sub-themes without requiring user involvement to provide specific themes to be discovered.

It should be appreciated that hierarchical clustering discovers themes and sub-themes from the vast amount of data, without user involvement, that may otherwise not be uncovered. It should also be appreciated that such initial discovery of themes is further utilized to discover related themes, the relationship between such themes, and sub-themes to provide additional understanding and insights regarding the discovered themes. Such initially discovered themes are retrieved without repeated or unnecessary textual data processing to improve efficiency and accuracy. In an embodiment, the discovery of themes by applying the trained hierarchical clustering model may be continuously performed on stored textual data in the corpus, intermittently performed whenever new textual data is received, or the like.

At S340, a name is generated for each identified cluster (and sub-cluster). A naming model including a generative model is applied to the identified clusters to create a name (or title) and a short description for each cluster based on the content of the cluster. In an embodiment, textual units that are, for example, but not limited to, most representative texts, salient words, highest probability words, most frequently occurring words, and the like in each cluster are selected and used to generate the title and the short description. In an embodiment, the generative model is a language model or large language model (LLM) such as, but not limited to, Generative Pre-trained Transformer-3 (GPT-3), Generative Pre-trained Transformer-J (GPT-J), Generative Pre-trained Transformer-4 (GPT-4), Text-to-Text Transfer Transformer (T5), Bidirectional and Auto-Regressive Transformers (BART), Language Model for Dialogue Applications (LaMDA), Large Language Model Meta AI (LLaMA), and the like, and more.

At S350, identified clusters are analyzed. The analysis is performed on cluster units as well as textual units within each cluster. That is, relationships between clusters, for example, their separation, as well as intra-cluster relations, for example, cohesion between textual units, are detected. In addition, trends of clusters (or themes) that suggest significance within various data segments, changes over time, and the like, are identified. Various metrics (or distribution metrics) such as Silhouette scores, Dunn index, McClain-Rao index, C-index, and the like are determined for the identified cluster, which may also be ranked according to such metrics. In an example embodiment, metrics determined for each identified cluster are represented in a plot with respect to time indicating time-dependent changes (e.g., by weeks, months, quarters, etc.). In a further example embodiment, a time-series analysis method may be performed to keep track of the trend component and rank the clusters in terms of magnitudes of change. In an embodiment, the analyses, determined metrics, and plots for the clusters may be stored in a memory and/or corpus (e.g., the data corpus 120, FIG. 1).

The determined distribution metrics provide at least one numerical value indicating the quality of each of the identified clusters in each of the theme data structures. The numerical value such as, but not limited to, a score, a ranking, and the like, and any combination thereof describes the relationship between data within the cluster and between different clusters, where a high numerical value indicates an intra-cluster cohesion and an inter-cluster incoherence. For example, a first cluster with a high score includes textual units that are semantically close (i.e., close in an embedding space) and the included textual units are semantically far (i.e., distant in the embedding space) to one or more second clusters. In an embodiment, at least one distribution metric is determined for the cluster and may be stored in association with the respective cluster and its theme data structure. In a further embodiment, parameters such as, but not limited to, size, data points (e.g., textual units), temporal distributions, and the like, and any combination thereof, are utilized to determine importance or significance. The importance or significance of the respective clusters may be used to sort the orders of the respective theme data structures and their associated themes.

In an embodiment, the distribution metrics (e.g., score, rank, and the like) is utilized to monitor a trend in the input textual data such as, but not limited to, increasing trend of a theme, decreasing theme occurrence in conversations, popular themes, and the like, and any combination thereof. As noted above, the distribution metrics are determined for the identified clustered. The distribution metric such as, but not limited to, score, rank, and the like, and any combination thereof, as well as parameters such as, but not limited to, size, may change as the input textual data are processed. The determined metrics are tracked over time for a specific theme (i.e., the identified cluster) in order to determine changes in conversation with respect to the specific theme. As an example, a first theme, described by a first theme data structure, has a high score and is ranked on top at a first time. Thereafter, the score for the first theme gradually decreases and the ranking drops below a predefined threshold rank. In such a case, it is determined that the first theme is no longer of interest in conversations, for example, not a relevant product feature that a customer is interested in. In another example, a sudden increase in a second score associated with a product and a third score associated with complaints may be detected. In such a case, the monitored score changes may be utilized as an indicator that the product is receiving complaints and needs attention.

It should be noted that the analyses and associated plots enable close tracking and monitoring of changes of clusters (and their themes) over, for example, time, different conversations, teams, and the like to provide an overall and developing understanding of conversations rather than of isolated instances. The distribution metrics are consistently and accurately determined for objective monitoring of the generated theme structures and described themes. It should be further noted that the tracking of related conversations eliminates redundant processing of textual data of such related conversations to conserve computing power and memory. Moreover, fast retrieval of such relevant data is enabled as conversations are monitored and organized in association with themes, teams, conversations, and the like, to further reduce processing time.

At S360, a notification is generated and caused to be displayed. A notification such as, but not limited to, report, alert, suggestion, plot, and the like is generated and displayed via a user device (e.g., the user device 150, FIG. 1). The notification may be generated based on various distribution metrics determined for the clusters (its theme data structures and associated themes) and include information such as themes, relevant conversations, participants, metrics, trend (or change) of themes, and the like, and any combination thereof. In an embodiment, the notification is displayed through a dashboard for the user to interact with. In an embodiment, the user may choose to see portions of the notification based on business metadata such as, but not limited to, deal outcomes, teams, business lines, tiers, and the like, and any combination thereof. In some implementations, the notification is generated based on a plurality of rules such as, but not limited to, a change in trend beyond a predetermined threshold value, a ranking above a predetermined threshold rank, and the like, and more. The notification generation and causing the display may be referred to as an actionable insight.

In some implementations, the notification includes other actionable insights that are determined and suggested to the user of the user device to perform. Such actionable insights are generated based on the aggregation of data of at least one theme data structure. As an example, upon identifying a rise in negative feedback about high pricing, one or more actionable insights including suggestion actions are generated. Some example actions may include, without limitation, repricing, restricting multi-year deals to customers, scheduling an internal training session to address such customer concerns, and the like, and any combination thereof. In an example embodiment, the actionable insights of a suggested action are selected from a predetermined list.

Figure 4:
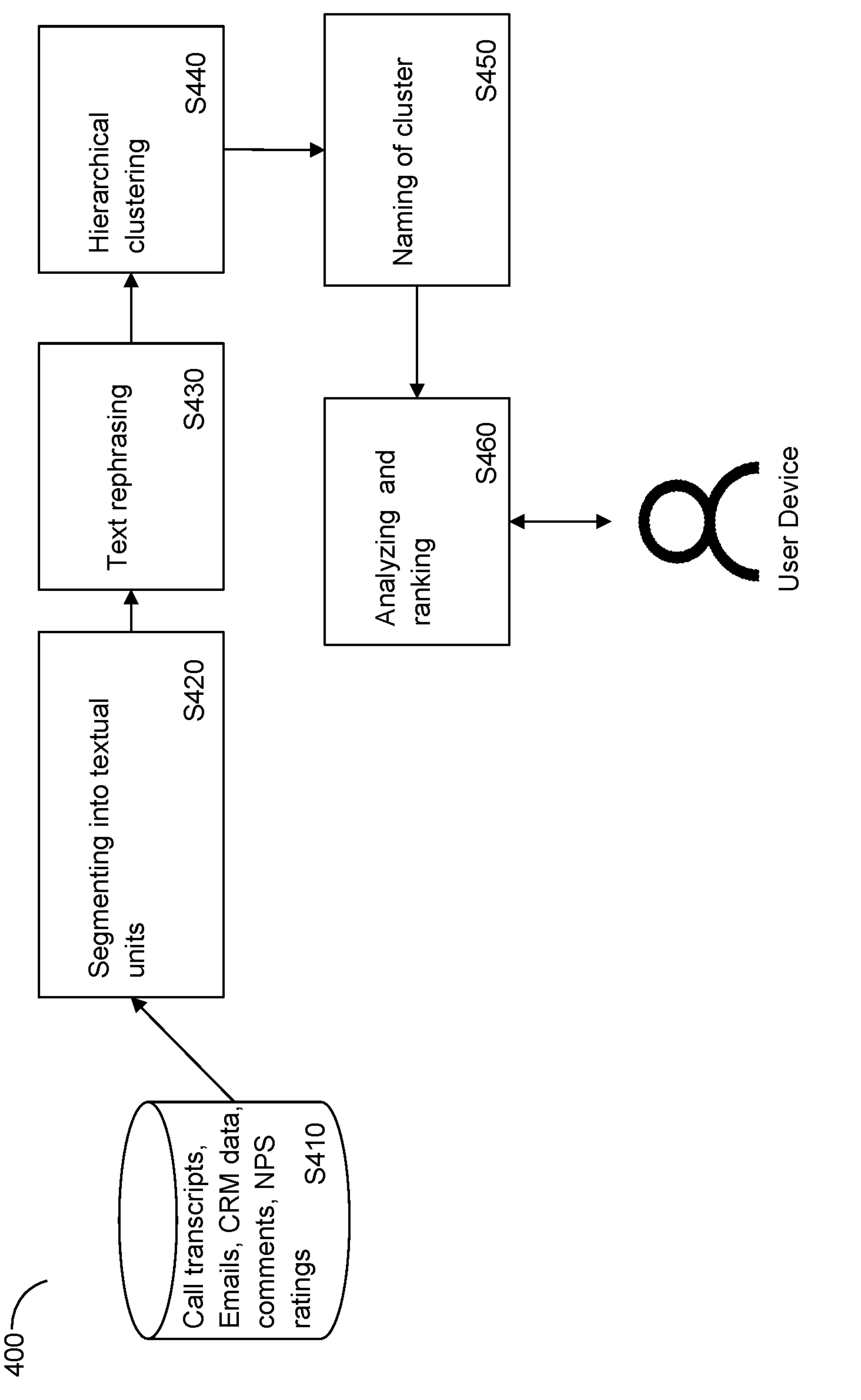
FIG. 4 is a flow diagram illustrating a method for discovering themes according to one embodiment.

FIG. 4 is an example flow diagram 400 illustrating a method for discovering themes according to one example embodiment. The method described herein may be executed by the aggregating system 110, FIG. 1.

At S410, textual data such as, but not limited to, call transcripts, emails, CRM data, comments, NPS ratings, and the like, are received from the corpus. At S420, the textual data are segmented into textual units that are shorter and smaller in size than the textual data. At S430, the textual data are rewritten (or rephrased) into a concise and abbreviated format. At S440, hierarchical clustering of textual data is performed to output clusters and sub-clusters that are grouped according to the theme (or content). At S450, the clusters and sub-clusters are input into a naming model to identify and generate a name and a short description for each cluster. At S460, analyses of the named clusters are performed to determine metrics to identify trends suggesting, for example, but not limited to, significance within clustered segments, inter-cluster separation, intra-cluster cohesion, changes of theme over time, changes of theme discovery over time, and the like, and any combination thereof. In addition, the discovered themes of the textual data may be ranked based on the determined metrics. A user such as, but not limited to, a sales associate, sales leaders, C-level executives, and the like, and any combination thereof may be provided with the determined metrics via a user device. In some embodiments, the user may use an interactive graphical user interface (GUI) via the user device to interact and view the identified trends.

As an example, a sales leader (i.e., the user) wants to understand which themes and/or sub-themes are trending up or down within her team's business conversations, for example, to discover reasons for customer dissatisfaction that may be impacting churn rate. In this example, the trend analysis may indicate increased dissatisfaction surrounding data privacy than in the last quarter, which can be identified as a reason for her team losing more deals.

As another example, a sales team leader (i.e., the user) wants to know the main themes raised by the customers in her team's business conversations. A trend analysis report may provide the main themes identified in customer-sales conversations as well as changes with time to provide an overall understanding, all in a single report. In such a scenario, the user may select one or more of the identified main themes to focus on and further investigate the trends for insight.

Figure 5:
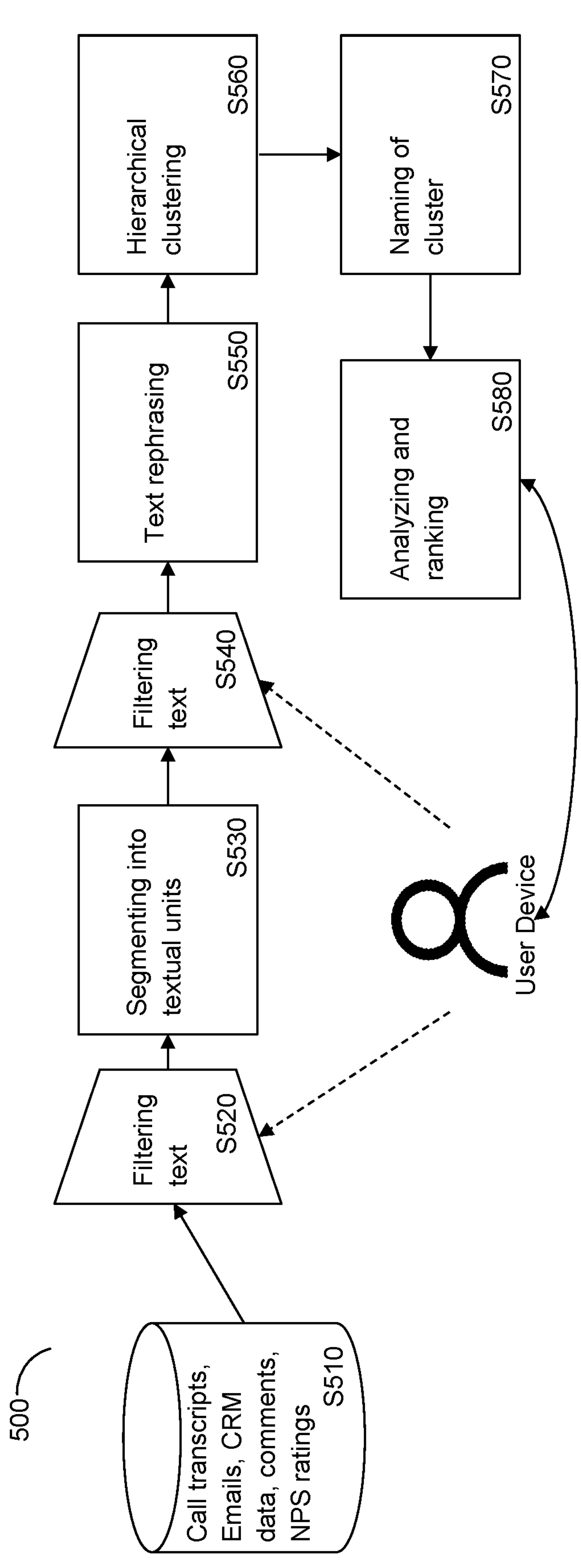
FIG. 5 is a flow diagram illustrating a method for discovering predefined themes according to one embodiment.

FIG. 5 is an example flow diagram 500 illustrating a method for discovering predefined themes according to one example embodiment. The method described herein may be executed by the aggregating system 110, FIG. 1.

At S510, textual data such as, but not limited to, call transcripts, emails, CRM data, comments, NPS ratings, and the like, are received from the corpus. At S520, the received textual data are filtered, for example, by instruction or predefined criteria set by a user. At S530, the textual data are segmented into textual units that are shorter and smaller in size than the textual data. At S540, the segmented textual units may be filtered to remove irrelevant textual units. A user may input preferences for certain themes to filter out segments with unrelated content via a user device. At S550, the textual data are rewritten (or rephrased) into a concise and abbreviated format. At S560, hierarchical clustering of textual data is performed to output clusters and sub-clusters that are grouped according to the theme (or content). At S570, the clusters and sub-clusters are input into a naming model to identify and generate a name and a short description for each cluster. At S580, analyses of the named clusters are performed to determine metrics to identify trends suggesting, for example, but not limited to, significance within clustered segments, inter-cluster separation, intra-cluster cohesion, changes of theme over time, changes of theme discovery over time, and the like, and any combination thereof. In addition, the discovered themes of the textual data may be ranked based on the determined metrics. A user such as, but not limited to, a sales associate, sales leaders, C-level executives, and the like, and any combination thereof may be provided with the determined metrics via a user device. In some embodiments, the user may use an interactive graphical user interface (GUI) to interact and view the identified trends.

Following the same example above, the sales team leader may decide to focus on a certain theme (e.g., competition) uncovered from the aggregating system. The certain theme may be broken up into sub-themes (e.g., competitor mentions in the context of positive or negative feedback, comparison, trials) and further drilled down into specific moments in the written/spoken conversations. Here, each theme and sub-theme are automatically given a name and a short description.

As another example, a chief revenue officer (CRO) (i.e., a user) wants to understand the point of view of the customer surrounding a specified theme, that is, the main sub-themes within the specified theme. The theme may be provided as a word (e.g., a recently launched product name or "transcriptions") or a description ("moments where customers are discussing their pain points"). The cluster associated with the specified sub-themes can be further segmented by team, business line, customer industry, and more. Moreover, these sub-themes can be correlated with business outcomes such as won or lost deals.

In yet another example, a sales enablement manager wants to surface aggregate information about specific entities detected in conversations, for example, but not limited to, questions, competitor mentions, and the like, in order to understand the most frequently asked questions or the top competitive objections, respectively. The user may input such predefined specific entities to discover clusters of textual data associated with the entities, which may be used to create training material and to talk tracks for the GTM (Go-to-market) team.

Figure 6:
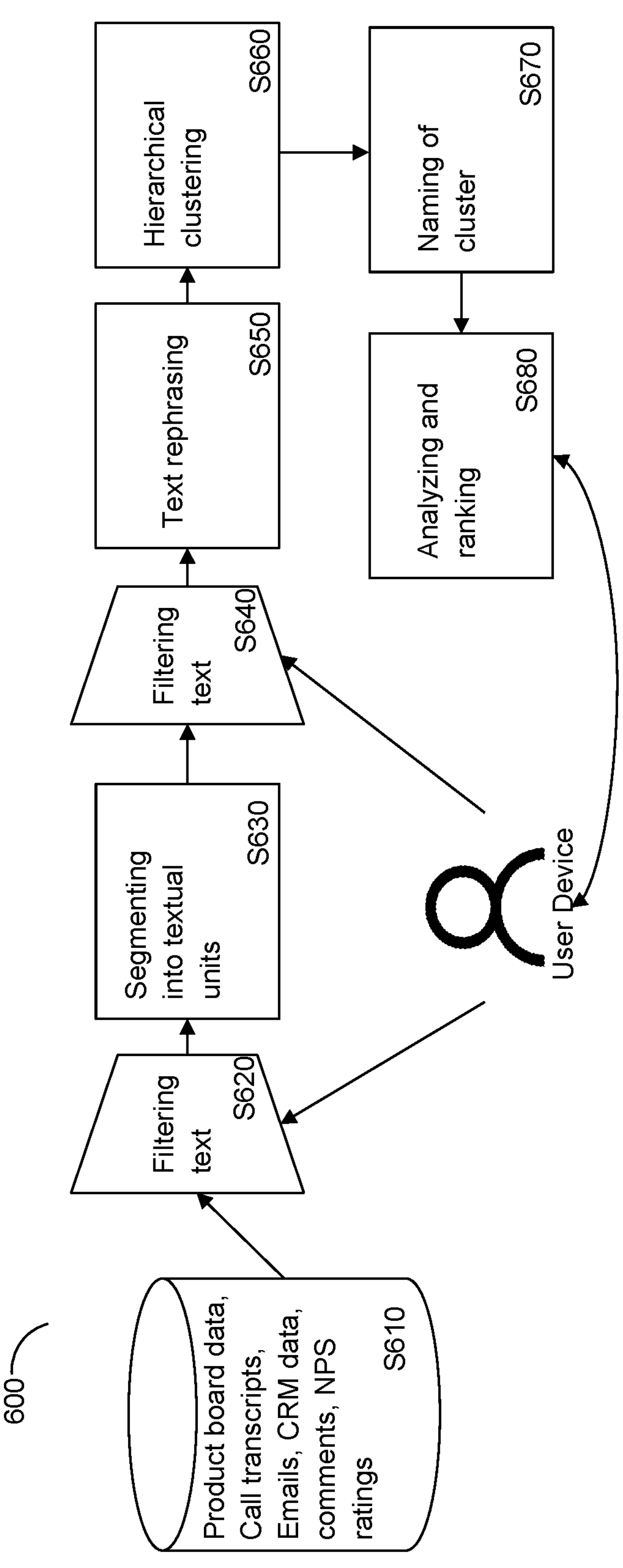
FIG. 6 is a flow diagram illustrating a method for discovering requested themes according to one embodiment.

FIG. 6 is an example flow diagram 600 illustrating a method for discovering requested features according to one example embodiment. The method described herein may be executed by the aggregating system 110, FIG. 1.

At S610, textual data such as, but not limited to, product board data, call transcripts, emails, CRM data, comments, NPS ratings, and the like, are received from the corpus. At S620, the received textual data are filtered, for example, by instruction or predefined criteria set by a user. At S630, the textual data are segmented into textual units that are shorter and smaller in size than the textual data. At S640, the segmented textual units may be filtered to remove irrelevant textual units. A user may input preferences for certain themes to filter out segments with unrelated content via a user device. At S650, the textual data are rewritten (or rephrased) into a concise and abbreviated format. At S660, hierarchical clustering of textual data is performed to output clusters and sub-clusters that are grouped according to the theme (or content). At S670, the clusters and sub-clusters are input into a naming model to identify and generate a name and a short description for each cluster. At S680, analyses of the named clusters are performed to determine metrics to identify trends suggesting, for example, but not limited to, significance within clustered segments, inter-cluster separation, intra-cluster cohesion, changes of theme over time, changes of theme discovery over time, and the like, and any combination thereof. In addition, the discovered themes of the textual data may be ranked based on the determined metrics. A user such as, but not limited to, a sales associate, sales leaders, C-level executives, and the like, and any combination thereof may be provided with the determined metrics via a user device. In some embodiments, the user may use an interactive graphical user interface (GUI) to interact and view the identified trends.

As an example, a product analyst wants to compile a list of feature requests for his product roadmap meeting. The graphical user interface including a dashboard is utilized to display the top requests and complaints by customers in the past two weeks, as discovered by textual clusters within the themes of "top requests" and "complaints." Such revealed information is key for the user to understand product gaps or features that do not work as anticipated.

Figure 7:
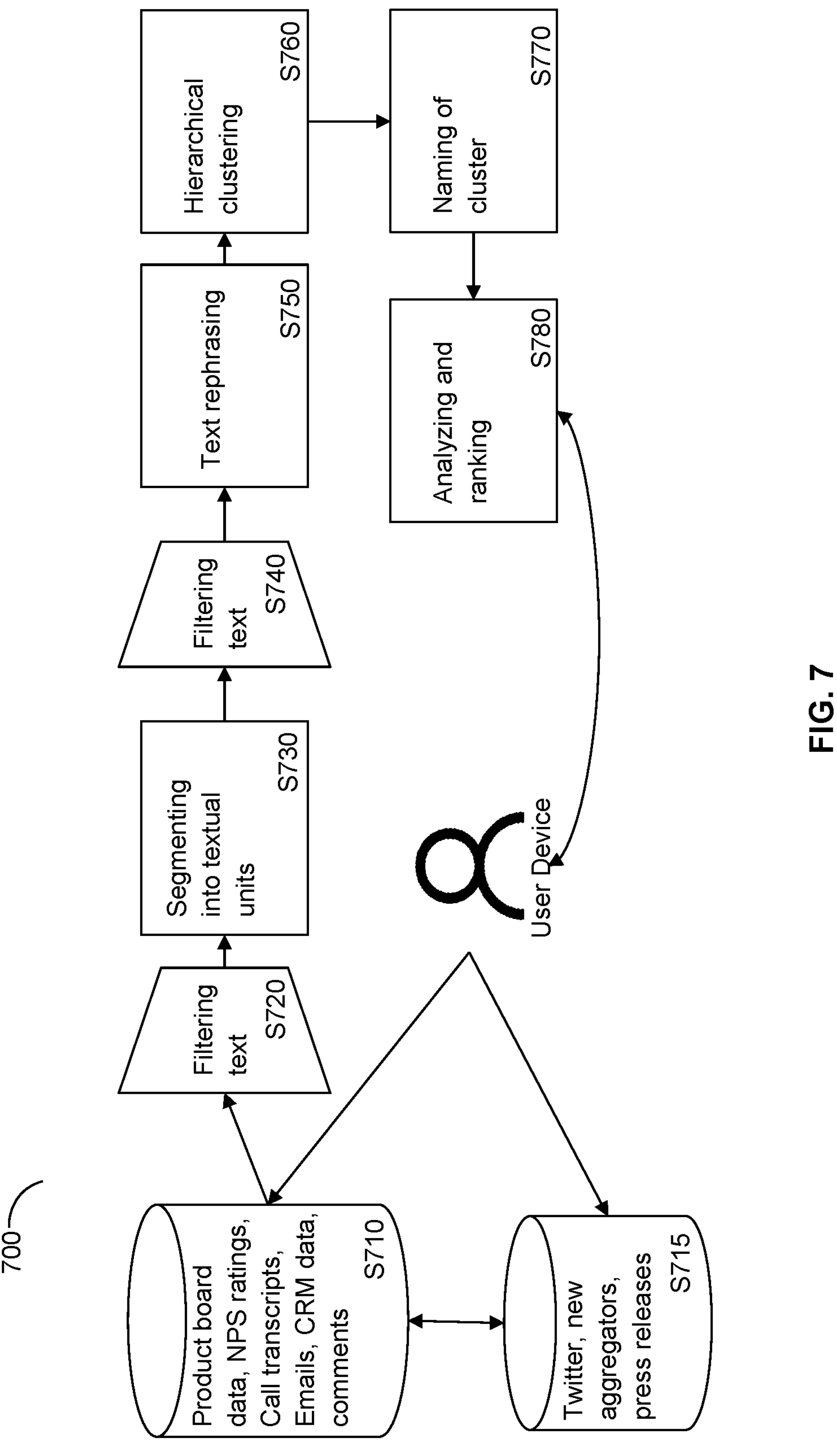
FIG. 7 is a flow diagram illustrating a method for discovering themes based on external sources according to one embodiment.

FIG. 7 is an example flow diagram 700 illustrating a method for discovering themes based on external sources according to one example embodiment. The method described herein may be executed by the aggregating system 110, FIG. 1.

At S710, textual data such as, but not limited to, product board data, call transcripts, emails, CRM data, comments, NPS ratings, and the like, are received from the corpus. At S715, external data such as, but not limited to, social media, news aggregators, press releases, and the like, are received from external sources. The external theme data may be provided to internal data, for example, to the corpus and/or metadata database. At S720, the received textual data are filtered, for example, by instruction or predefined criteria set by a user. At S730, the textual data are segmented into textual units that are shorter and smaller in size than the textual data. At S740, the segmented textual units may be filtered to remove irrelevant textual units. In some cases, the irrelevant textual data may be determined based on the mapping of external theme data and internal data. At S750, the textual data are rewritten (or rephrased) into a concise and abbreviated format. At S760, hierarchical clustering of textual data is performed to output clusters and sub-clusters that are grouped according to the theme (or content). At S770, the clusters and sub-clusters are input into a naming model to identify and generate a name and a short description for each cluster. At S780, analyses of the named clusters are performed to determine metrics to identify trends suggesting, for example, but not limited to, significance within clustered segments, inter-cluster separation, intra-cluster cohesion, changes of theme over time, changes of theme discovery over time, and the like, and any combination thereof.

In addition, the discovered themes of the textual data may be ranked based on the determined metrics. A user such as, but not limited to, a sales associate, sales leaders, C-level executives, and the like, and any combination thereof may be provided with the determined metrics via a user device. In some embodiments, the user may use an interactive graphical user interface (GUI) to interact and view the identified trends.

As an example, a revenue operations representative wants to understand the effect of news appearing in external sources, such as, but not limited to, competitor websites, news aggregators, Twitter feeds, and the like, on the business outcomes of customer conversations. The themes in the external sources are input and mapped to the internal conversations. The input external themes are tracked and analyzed in the various conversations that are stored within the corpus to reveal relevant textual data, closely associated themes, sub-themes within the external themes, and the like.

Figure 8:
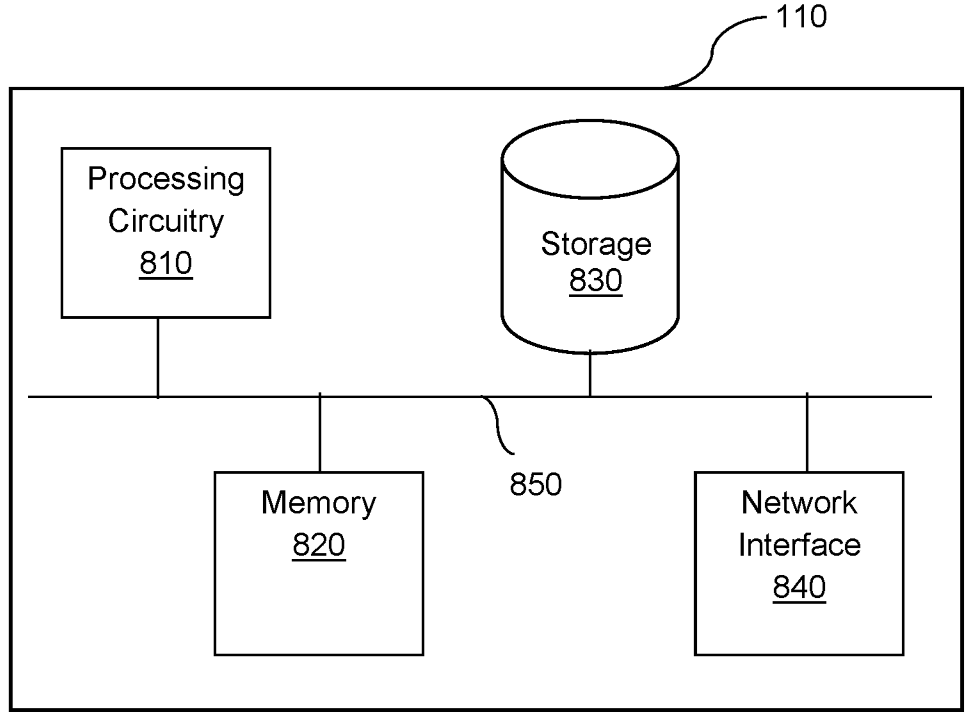
FIG. 8 is a schematic diagram of an aggregating system according to an embodiment.

FIG. 8 is an example schematic diagram of an aggregating system 110 according to an embodiment. The aggregating system 110 includes a processing circuitry 810 coupled to a memory 820, a storage 830, and a network interface 840. In an embodiment, the components of the aggregating system 110 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose central processing units (CPUs), microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 840 allows the aggregating system 110 to communicate with other elements over the network 130 for the purpose of, for example, receiving data, sending data, and the like.

It should be understood that the embodiments described herein are not limited to the specific architecture illustrated in FIG. 8, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices.

The application program may be uploaded to, and executed by, a machine comprising any suitable architecture. Preferably, the machine is implemented on a computer platform having hardware such as one or more central processing units ("CPUs"), general purpose compute acceleration device such as graphics processing units ("GPU"), a memory, and input/output interfaces. The computer platform may also include an operating system and microinstruction code. The various processes and functions described herein may be either part of the microinstruction code or part of the application program, or any combination thereof, which may be executed by a CPU or a GPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for discovering and aggregating themes, further comprising:

applying a trained clustering model to a plurality of textual data, wherein the trained clustering model determines at least one cluster of textual data based on a meaning of the textual data, wherein textual data of the at least one cluster is a portion of the plurality of textual data;

generating a name, using a trained naming model, for each of the at least one cluster based on textual units in the respective at least one cluster, wherein the generated name indicates a theme that represents the meaning of the textual data of the at least one cluster;

analyzing the at least one cluster to determine a distribution metric of the at least one cluster; and generating a notification, with respect to at least one theme, based on a plurality of rules applied to the determined distribution metric and the at least one cluster associated with the at least one theme.

2. The method of claim 1, further comprising:

segmenting the textual data of the plurality of textual data into textual units; and rephrasing the textual units to generate normalized formats of the textual units.

3. The method of claim 1, wherein the trained clustering model is a hierarchical clustering model that determines at least one sub-cluster for each of the determined at least one cluster.

4. The method of claim 1, further comprising:

aggregating the determined distribution metric and at least one other distribution metric of the at least one cluster, wherein the at least one other distribution metric is previously determined for the respective at least one cluster; and identifying a trend in the theme by comparing the aggregated determined distribution metric and the at least one other distribution metric.

5. The method of claim 4, further comprising:

triggering the generation of the notification upon determination that the identified change is beyond a predetermined threshold value.

6. The method of claim 1, wherein the distribution metric is a numerical value that indicates a quality of the at least one cluster, and wherein the distribution metric is at least one of: Silhouette scores, Dunn index, McClain-Rao index, and C-index.

7. The method of claim 1, wherein the textual data is collected from at least one of: videoconferences, telephonic conversations, emails, text messages, chats, and customer relationship management (CRM) data.

8. The method of claim 1, wherein the textual data of the at least one cluster is related to at least one of: sales and customer relationships.

9. The method of claim 1, further comprising:

receiving an external input data from an external source; and filtering the plurality of textual data by mapping to the external input data, wherein a portion of the plurality of textual data that is not mapped is filtered out.

10. The method of claim 1, wherein the trained clustering model applies any one of: hierarchical Latent Dirichlet Allocation (LDA), Bidirectional Encoder Representations from Transformers leveraged topic modeling (BERTopic), or hierarchical Density-based spatial clustering of applications (DBSCAN).

11. A non-transitory computer readable medium having stored thereon instructions for causing a processing circuitry to execute a process, the process comprising:

applying a trained clustering model to a plurality of textual data, wherein the trained clustering model determines at least one cluster of textual data based on a meaning of the textual data, wherein textual data of the at least one cluster is a portion of the plurality of textual data;

generating a name, using a trained naming model, for each of the at least one cluster based on textual units in the respective at least one cluster, wherein the generated name indicates a theme that represents the meaning of the textual data of the at least one cluster;

analyzing the at least one cluster to determine a distribution metric of the at least one cluster; and generating a notification, with respect to at least one theme, based on a plurality of rules applied to the determined distribution metric and the at least one cluster associated with the at least one theme.

12. A system for discovering and aggregating themes, comprising:

a processing circuitry; and a memory, the memory containing instructions that, when executed by the processing circuitry, configure the system to:

apply a trained clustering model to a plurality of textual data, wherein the trained clustering model determines at least one cluster of textual data based on a meaning of the textual data, wherein textual data of the at least one cluster is a portion of the plurality of textual data;

generate a name, using a trained naming model, for each of the at least one cluster based on textual units in the respective at least one cluster, wherein the generated name indicates a theme that represents the meaning of the textual data of the at least one cluster;

analyze the at least one cluster to determine a distribution metric of the at least one cluster; and generate a notification, with respect to at least one theme, based on a plurality of rules applied to the determined distribution metric and the at least one cluster associated with the at least one theme.

13. The system of claim 12, wherein the system is further configured to:

segment the textual data of the plurality of textual data into textual units; and rephrase the textual units to generate normalized formats of the textual units.

14. The system of claim 12, wherein the trained clustering model is a hierarchical clustering model that determines at least one sub-cluster for each of the determined at least one cluster.

15. The system of claim 12, wherein the system is further configured to:

aggregate the determined distribution metric and at least one other distribution metric of the at least one cluster, wherein the at least one other distribution metric is previously determined for the respective at least one cluster; and identify a trend in the theme by comparing the aggregated determined distribution metric and the at least one other distribution metric.

16. The system of claim 15, wherein the system is further configured to:

trigger the generation of the notification upon determination that the identified change is beyond a predetermined threshold value.

17. The system of claim 12, wherein the distribution metric is a numerical value that indicates a quality of the at least one cluster, and wherein the distribution metric is at least one of: Silhouette scores, Dunn index, McClain-Rao index, and C-index.

18. The system of claim 12, wherein the textual data is collected from at least one of: videoconferences, telephonic conversations, emails, text messages, chats, and customer relationship management (CRM) data.

19. The system of claim 12, wherein the textual data of the at least one cluster is related to at least one of: sales and customer relationships.

20. The system of claim 12, wherein the system is further configured to:

receive an external input data from an external source; and filter the plurality of textual data by mapping to the external input data, wherein a portion of the plurality of textual data that is not mapped is filtered out.

21. The system of claim 12, wherein the trained clustering model applies any one of: hierarchical Latent Dirichlet Allocation (LDA), Bidirectional Encoder Representations from Transformers leveraged topic modeling (BERTopic), or hierarchical Density-based spatial clustering of applications (DBSCAN).

* * * * *